US011447680B2

(12) United States Patent
Khramov et al.

(10) Patent No.: US 11,447,680 B2
(45) Date of Patent: Sep. 20, 2022

(54) ADDITIVE TO IMPROVE COLD TEMPERATURE PROPERTIES IN OIL-BASED FLUIDS

(71) Applicant: M-I L.L.C., Houston, TX (US)

(72) Inventors: Dimitri M. Khramov, Katy, TX (US); Reda Karoum, Houston, TX (US); Stephen Cliffe, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 464 days.

(21) Appl. No.: 15/904,897

(22) Filed: Feb. 26, 2018

(65) Prior Publication Data
US 2018/0244975 A1    Aug. 30, 2018

Related U.S. Application Data

(60) Provisional application No. 62/463,698, filed on Feb. 26, 2017.

(51) Int. Cl.
    C09K 8/36    (2006.01)
    C09K 8/035   (2006.01)
    E21B 21/00   (2006.01)

(52) U.S. Cl.
    CPC ............... C09K 8/36 (2013.01); C09K 8/035 (2013.01); E21B 21/00 (2013.01); E21B 21/001 (2013.01)

(58) Field of Classification Search
    CPC .............................. C09K 8/035; C09K 8/602
    See application file for complete search history.

(56) References Cited

U.S. PATENT DOCUMENTS

| | | | |
|---|---|---|---|
| 4,381,241 A | 4/1983 | Romenesko et al. | |
| 4,508,628 A | 4/1985 | Walker et al. | |
| 5,007,489 A | 4/1991 | Enright et al. | |
| 5,057,234 A | 10/1991 | Bland et al. | |
| 6,147,047 A * | 11/2000 | Robbins | C11D 1/83 510/417 |
| 6,387,874 B1 * | 5/2002 | Schalitz | C11D 1/62 510/199 |
| 7,534,743 B2 | 5/2009 | Kirsner et al. | |
| 8,476,201 B2 | 7/2013 | Miller et al. | |
| 8,476,206 B1 | 7/2013 | Malshe | |
| 8,569,213 B2 | 10/2013 | Miller et al. | |
| 9,518,206 B2 | 12/2016 | Maghrabi et al. | |
| 2004/0110642 A1 | 6/2004 | Thompson et al. | |
| 2005/0049147 A1 | 3/2005 | Patel et al. | |
| 2009/0107681 A1 | 4/2009 | Hough et al. | |
| 2009/0192052 A1 | 7/2009 | Zhang | |
| 2010/0258313 A1 | 10/2010 | Ballard | |
| 2011/0160099 A1 | 6/2011 | Patel et al. | |
| 2011/0166047 A1 | 7/2011 | Patel et al. | |
| 2011/0180256 A1 | 7/2011 | Tehrani et al. | |
| 2011/0284228 A1 | 11/2011 | Huang et al. | |
| 2012/0080232 A1 | 4/2012 | Muller et al. | |
| 2013/0048281 A1 | 2/2013 | Van Zanten et al. | |
| 2013/0137611 A1 | 5/2013 | Pierce et al. | |
| 2013/0331303 A1 | 12/2013 | Rife et al. | |
| 2014/0349908 A1 * | 11/2014 | Delaney | C11D 3/2075 510/337 |
| 2014/0357533 A1 | 12/2014 | Wells et al. | |
| 2018/0155610 A1 | 6/2018 | Goual et al. | |
| 2018/0244976 A1 | 8/2018 | Cliffe et al. | |
| 2018/0362833 A1 | 12/2018 | Jackson et al. | |
| 2019/0382641 A1 | 12/2019 | Cliffe et al. | |
| 2020/0231860 A1 | 7/2020 | Khramov et al. | |

FOREIGN PATENT DOCUMENTS

| | | |
|---|---|---|
| CN | 103555304 A | 2/2014 |
| EP | 2258803 A2 | 12/2010 |
| RU | 2458958 C1 | 8/2012 |
| RU | 2492207 C1 | 9/2013 |
| WO | 0041480 A2 | 7/2000 |
| WO | 02053676 A1 | 7/2002 |
| WO | 2012003325 A1 | 1/2012 |
| WO | 2013-095934 A2 | 6/2013 |
| WO | 2016/010518 A1 | 1/2016 |
| WO | 2016-137922 A1 | 9/2016 |
| WO | 2019028198 A1 | 2/2019 |
| WO | 2020097489 A1 | 5/2020 |

OTHER PUBLICATIONS

Technical Data Sheet of Tergol-15-s-3 of The Dow Chemical Company (Year: 2021).*
Office Action issued in U.S. Appl. No. 15/905,053; dated Aug. 24, 2020 (37 pages).
Office Action dated Nov. 13, 2019, by the U.S Patent and Trademark Office, in related U.S. Appl. No. 16/905,053 (21 pages).
International Preliminary Report on Patentability (IPRP) and Written Opinion dated Sep. 6, 2019, in corresponding International Application No. PCT/US2018/019759 (9 pages).
International Preliminary Report on Patentability (IPRP) and Written Opinion dated Sep. 6, 2019, in corresponding International Application No. PCT/US2018/019758 (9 pages).
Office Action issued in U.S. Appl. No. 15/905,053; dated May 1, 2020 (29 pages).
Extended European Search Report and Opinion issued in EP Patent Application No. 18758013.9 dated Dec. 7, 2020, 6 pages.
PCT International Search Report and Written Opinion dated Jun. 21, 2018, by the Korean Intellectual Property Office in corresponding International Application No. PCT/US2018/019758 (10 pages).

(Continued)

Primary Examiner — Aiqun Li
(74) Attorney, Agent, or Firm — Garry Brown, Jr.

(57) ABSTRACT

An additive composition includes a rheology modifier selected from alcohol ethoxylates, amine ethoxylates, or ethylene oxide/propylene oxide copolymers, wherein the rheology modifier has an HLB ranging from about 4 to 10; and a winterizing agent that is at least one aliphatic nonionic surfactant that has a branched structure and/or includes at least one unsaturation, wherein the winterizing agent has an HLB value between about 8 and 10.5.

12 Claims, No Drawings

(56) References Cited

OTHER PUBLICATIONS

PCT International Search Report and Written Opinion dated Jun. 21, 2018, by the Korean Intellectual Property Office in corresponding International Application No. PCT/US2018/019759 (10 pages).
Office Action received in U.S. Appl. No. 16/487,830 dated Oct. 9, 2020, 8 pages.
International Search Report and Written Opinion issued in International Patent application PCT/US2019/060513 dated Apr. 9, 2020, 13 pages.
International Preliminary Report on Patentability issued in International Patent application PCT/US2019/060513 dated May 20, 2021, 10 pages.
Office Action issued in U.S. Appl. No. 15/905,053, dated May 28, 2021, 16 pages.
Spectrum Chemical MFG Corp, TERGITOL(R) TMN-g, Surfactant, Product Details, retrieved May 25, 2021 from https://www.spectrumchemical.com/OA HTML/chemical-products Tergitol R-TM N-6-Surfactant T1303.jsp (Year: 2021).
Office Action issued in U.S. Appl. No. 16/487,830 dated Mar. 23, 2021, 8 pages.
Search Report and Office Action issued in Russian Patent Application No. 2019130054 dated Jul. 5, 2021, 10 pages with English translation.
Exam Report issued in United Kingdom Patent Application No. GB1912094.8 dated Sep. 1, 2021, 4 pages.
U.S. Office Action dated Aug. 9, 2019, in corresponding U.S. Appl. No. 15/905,053 (9 pages).
NEODOL 25-3, Technical Data Sheet, retrieved Sep. 21, 2021 from file:///C:/Users/aditrani/Documents/e-Red%20Folder/15905053/neodol-25-3-tds-nov-2020.pdf.
Spectra Base, SILWET L-77, retrieved Sep. 21, 2021 from https://spectrabase.com/spectrum/7Wh07HcgEuf.
Office Action issued in U.S. Appl. No. 15/905,053 dated Jan. 6, 2022, 15 pages.
Decision on Grant issued in Russian Patent Application dated Dec. 8, 2021, 16 pages.
Office Action issued in U.S. Appl. No. 16/487,830 dated Oct. 13, 2021, 7 pages.
Exam Report issued in United Kingdom Patent Application No. GB1912094.8 dated Feb. 18, 2022, 4 pages.
Office Action issued in U.S. Appl. No. 17/291,627 dated Mar. 31, 2022, 14 pages.
1st Exam Report issued in Saudi Arabian Patent Application No. 519402534 dated Mar. 18, 2022, 9 pages with English translation.
Office Action issued in U.S. Appl. No. 16/556,798 dated Apr. 11, 2022, 9 pages.

* cited by examiner

ADDITIVE TO IMPROVE COLD TEMPERATURE PROPERTIES IN OIL-BASED FLUIDS

CROSS-REFERENCE TO RELATED APPLICATIONS

This Application claims priority to U.S. Provisional Patent Application No. 62/463,698 filed on Feb. 26, 2017, which is incorporated herein by reference.

BACKGROUND

During the drilling of a wellbore, various fluids are typically used in the well for a variety of functions. The fluids may be circulated through a drill pipe and drill bit into the wellbore, and then may subsequently flow upward through the wellbore to the surface. During this circulation, the drilling fluid may act to remove drill cuttings from the bottom of the hole up to the surface, to suspend cuttings and weighting material when circulation is interrupted, to control subsurface pressures, to maintain the integrity of the wellbore until the well section is cased and cemented, to isolate the fluids from the subterranean formation by providing sufficient hydrostatic pressure to prevent the ingress of formation fluids into the wellbore, to cool and lubricate the drill string and bit, and/or to maximize penetration rate when drilling.

In most rotary drilling procedures, the drilling fluid takes the form of a "mud," i.e., a liquid having solids suspended therein. The solids function to impart desired rheological properties to the drilling fluid and also to increase the density thereof in order to provide a suitable hydrostatic pressure at the bottom of the well. The drilling mud may be either a water-based or an oil-based mud. As such, the ability to suspend drilling cuttings to reduce wear on the drill bit depends on the rheological properties of the drilling mud related to the viscosity of the drilling fluid.

Drilling muds may consist of polymers, biopolymers, clays and organic colloids added to a water-based fluid to obtain the desired viscous and filtration properties. Heavy minerals, such as barite or calcium carbonate, may be added to increase density. Solids from the formation are incorporated into the mud and often become dispersed in the mud as a consequence of drilling. Further, drilling muds may contain one or more natural and/or synthetic polymeric additives, including polymeric additives that increase the rheological properties (e.g., plastic viscosity, yield point value, gel strength) of the drilling mud, and polymeric thinners and flocculants.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to an additive composition includes a rheology modifier selected from alcohol ethoxylates, amine ethoxylates, or ethylene oxide/propylene oxide copolymers, wherein the rheology modifier has an HLB ranging from about 4 to 10; and a winterizing agent that is at least one aliphatic non-ionic surfactant that has a branched structure and/or includes at least one unsaturation, wherein the winterizing agent has an HLB value between about 8 and 10.5.

In another aspect, embodiments disclosed herein relate to a method of modifying cold temperature stability of a rheology modifier, the method including: combining a winterizing agent that is at least one aliphatic non-ionic surfactant that has a branched structure and/or includes at least one unsaturation with at least one rheology modifier to form a winterized composition, wherein the winterizing agent has an HLB value between about 8 and 10.5.

In yet another aspect, embodiments disclosed herein relate to a method of drilling a wellbore, including: pumping an oleaginous wellbore fluid into a wellbore while operating a drill bit therein, the oleaginous wellbore fluid comprising: an oleaginous continuous phase; a non-oleaginous discontinuous phase; an emulsifier stabilizing the non-oleaginous discontinuous phase in the oleaginous continuous phase; and an additive composition including: a rheology modifier selected from alcohol ethoxylates, amine ethoxylates, or ethylene oxide/propylene oxide copolymers, wherein the rheology modifier has an HLB ranging from about 4 to 10; and a winterizing agent that is at least one aliphatic non-ionic surfactant that has a branched structure and/or includes at least one unsaturation, wherein the winterizing agent has an HLB value between about 8 and 10.5.

In yet another aspect, embodiments disclosed herein relate to a wellbore fluid, including: an oleaginous continuous phase; a non-oleaginous discontinuous phase; an emulsifier stabilizing the non-oleaginous discontinuous phase in the oleaginous continuous phase; and an additive composition including: a rheology modifier selected from alcohol ethoxylates, amine ethoxylates, or ethylene oxide/propylene oxide copolymers, wherein the rheology modifier has an HLB ranging from about 4 to 10; and a winterizing agent that is at least one aliphatic non-ionic surfactant that has a branched structure and/or includes at least one unsaturation, wherein the winterizing agent has an HLB value between about 8 and 10.5.

Other aspects and advantages of the claimed subject matter will be apparent from the following description and the appended claims.

DETAILED DESCRIPTION

Embodiments disclosed herein relate generally to additive compositions that may be stable in cold environments (e.g. less than about 10° C.), improve cold temperature rheology of wellbore fluids and maintain necessary high temperature rheology and stability during wellbore operations. In particular, these additive compositions include a winterizing agent that may enhance the low temperature stability of the composition as a whole, while also not harming the rheological properties or stability obtained by rheological modifiers in the wellbore fluid (upon incorporation therein). While the term rheology modifier often is used to refer to components which thicken a fluid, in the present disclosure, the rheology modifier is being used a cold temperature thinner (i.e., modifying the rheology albeit in a different and in fact opposite manner than what a rheology modifier is conventionally thought to do). In general, the additive compositions may exhibit stability and pumpability in cold temperature environments (e.g., during storage or in subsea environments). Thus, the additive compositions may be handled and/or used effectively in cold temperature environments without any pretreatments (e.g., heating/mixing) that may be necessary for conventional additive compositions used to modify the rheology of wellbore fluids. Additionally, some embodiments are presented that relate to methods of making the additive composition, methods of addition of the additive compositions to the wellbore fluid, as well as methods of using the wellbore fluids. In one or more embodiments, the wellbore fluid may be a drilling fluid.

Generally, drilling fluids may maintain a certain viscosity profile to perform their intended function. Viscosity is measured at varying temperature and pressure, depending on the intended application of the fluid. Drilling fluids that are used in subsea drilling have a somewhat unique requirement of controlled cold temperature rheology (measured at 40° F.) because this is the temperature that is typically reached by the fluid as heat is lost to the seawater when the fluid travels between the surface and the sea floor.

Maintaining appropriate low cold temperature rheology is challenging because most of the time, the drilling fluid is subject to elevated temperatures in the borehole and the rheology of the fluid is optimized for high temperature conditions. Also base oils typically used to formulate fluids tend to increase in viscosity sharply at cold temperatures, leading to challenges with increased viscosity at 40° F.

Thus, it is desirable to have a wellbore fluid that has decreased cold temperature rheology while still maintaining appropriately high viscosity and gels at elevated temperatures. Further, generally, when there is a need for cold temperature rheology of a wellbore fluid, the environment in which the fluid is to be used is also cold, which makes fluid formulation a more challenging task.

Specifically, in some embodiments it may be necessary to add a rheology modifier to a "field mud" or into a mud on the spot or on the fly, rather than including the rheology modifier in the fluid when it is originally formulated. For example, rather than over treating a fluid with a rheology modifier based on original formulation, it may be desirable to add the appropriate amount of rheology modifier on location, on an as needed basis. However, in cold environments, such on the spot addition of a rheology modifier may be difficult due to the inherent low temperature properties of the chemistry (e.g., melting point, pour point, cloud point, etc.). Thus, the additive compositions of the present disclosure may include a winterization component and a rheology modifier. In one or more embodiments of this application, the present additive compositions may be added in the field to adjust cold temperature viscosity, or a fluid may be formulated with the presently disclosed additive(s) to provide the cold temperature rheology initially. When added in the field, the additive composition needs to be pumpable for ease of addition and handling on site. At temperatures less than about 10° C., conventional rheological modifiers can solidify or become too viscous making them difficult to handle and use in cold temperature environments. Further, common glycol-based pour point depressants such as triethylene glycol monobutyl ether (BTG) may separate during storage in cold environments when they are added to the rheological modifiers and therefore not being capable of effectively winterizing the rheological modifier. Further, when formulated into a wellbore fluid, conventional glycol-based pour point depressants can adversely affect fluid rheology and do not typically show stability at elevated temperatures for the extended periods of time experienced by a wellbore fluid. In contrast, the present additive compositions may effectively winterize the rheology modifiers, while also allowing the rheology modifiers to modify the rheology, both at low and high temperatures, including with long term stability, even at prolonged elevated temperatures.

Additive Compositions

In one or more embodiments, the additive compositions include a rheology modifier combined with a winterizing agent. The rheology modifier may be selected from alcohol ethoxylates, amine ethoxylates, or ethylene oxide/propylene oxide copolymers, wherein the rheology modifier has an HLB ranging from about 4 to 10.5; and the winterizing agent may be at least one non-ionic surfactant that has a branched structure and/or includes at least one unsaturation, wherein the winterizing agent has an HLB value between about 8 and 10.5.

Only select rheology modifiers may provide a wellbore fluid with the desired viscosity and improved cold temperature rheology (at 40 F), while also avoiding decomposition at elevated temperatures and showing long term stability under high temperature conditions. To mitigate sag of the weighting agent within an oleaginous fluid, without creating a rheological profile that is problematic at colder temperatures when the viscosity of the fluid will naturally increase (particularly as the base fluid interacts with the weighting agent particles present in the fluid), the present inventors have determined that addition of particular rheology modifiers to the fluid may result in a weighted fluid that avoids sag without having excessive viscosity, particularly at colder temperatures. Further, as mentioned above, "packaging" of the rheology modifiers also becomes very difficult in cold environments (less than 40 F) as the rheology modifiers become to precipitate, become cloudy, phase separate, etc. Thus, embodiments of the present disclosure are directed to the winterization of the rheology modifiers that does not negatively impact the rheology properties of the fluid to which the winterized rheology modifier is eventually added. Further, in one or more embodiments, the winterized rheology modifier may in fact even enhance the cold temperature rheology of the fluid, without negatively effecting the long term high temperature stability of the rheology.

For example, in one or more embodiments, the rheology modifier that is winterized has a hydrophilic-lipophilic-balance (HLB) value of between about 4 to 10, or from about 5 to 9, or from about 6 to 8. HLB values are empirical expressions for the relationship of the amount of hydrophilic and hydrophobic groups on a rheology modifier. In general, the higher the HLB value, the more water-soluble a rheology modifier will be. Further, and as will be demonstrated in the Examples below, after long term exposure to elevated temperatures, a fluid having a rheology modifier with a HLB value higher than about 10.5 may become degraded and destabilized, presumably due to decomposition of the rheology modifier. In one or more embodiments, the rheology modifier may be present in the wellbore fluid in an amount of about 0.5 to 10 pounds per barrel (ppb), or 1 to 6 ppb, or 1.5 to 5 ppb, or 2 to 4 pounds per barrel. The inventors theorize that the rheology modifier may preferentially wet the weighting agent particles present in the fluid so as to reduce sag of the particles within the fluid.

Thus, in one or more embodiments, a fluid including the rheology modifier therein may have minimal sag after a 7 day static period at elevated temperatures such as at least 200° F. 225° F., 250° F., 300° F., or 325° F. When fluid sags, the fluid exhibits a density change over the fluid column. Thus, by having minimal sag, the fluid may have less than a 1.25 or 1.0 ppg change over the static period. Another way of expressing this is through a "sag factor", which is calculated for a fluid heat aged in a static cell for a period of time of at least 16 hours, by dividing the bottom density by the sum of the top and bottom densities. A sag factor of 0.5 indicates no settlement of weighting agents. In one or more embodiments of the present disclosure, a sag factor of less than 0.54 may be achieved or less than 0.53, 0.52, or 0.51.

In one or more embodiments, the rheology modifier may be at least one selected from alcohol alkoxylates, amine alkoxylates, or ethylene oxide/propylene oxide copolymers. An alcohol ethoxylate rheology modifier according to the present disclosure may be generally depicted by Formula I below.

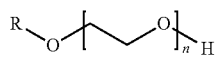

Formula I whereas an alcohol propoxylate would substitute a propylene oxide for the ethylene oxide used in an alcohol ethoxylate. It is also envisioned that a combination of ethoxylation and propoxylation may be used. In Formula I, R may be a C10-28 alkyl group (either linear or branched, saturated or unsaturated) and n may range between 2 and 6 (or 3 and 5 in some embodiments). Further, it is understood that other selections of R and n may be made so long as the resulting HLB is within the range described herein. In particular embodiments, R may be an oleyl group, a stearyl group, a tridecyl group, or a lauryl group. For example, in one or more embodiments, the rheology modifier may be at least one alcohol ethoxylate selected from group of oleyl alcohol-2-ethyoxylate, oleyl alcohol-3-ethyoxylate, oleyl alcohol-5-ethyoxylate, stearyl alcohol-2-ethyoxylate, stearyl alcohol-3-ethyoxylate, lauryl alcohol-4-ethyoxylate, and tridecyl alcohol-3-ethyoxylate.

In one or more embodiments, the rheology modifier may be at least one amine ethoxylate or amine propoxylate. Amine ethoxylates may have the general formula:

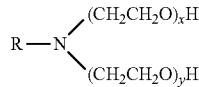

where R may be a C10-C26 alkyl group (either linear or branched, saturated or unsaturated), and x+y ranges from 2 to 15, or from 2 to 10 in more particular embodiments. One of ordinary skill in the art would appreciate that an amine propoxylate substitutes propoxylate groups for the shown ethoxylate groups in the above formula. In one or more embodiments, the amine ethoxylate may be selected from PEG-2 oleylamine, PEG-2 coco amine, PPG 2 cocoamine, PEG 15 cocoamine, PEG 5 tallow diamine, PEG-2 tallow amine, and PEG-5 tallow amine.

In one or more embodiments, the rheology modifier may be at least one ethylene oxide/propylene oxide copolymer that is selected from a poly(ethylene glycol)-block-poly(propylene glycol)-block-poly(ethylene glycol) or ethylene diamine ethylene oxide/propoylene oxide copolymer. The poly(ethylene glycol)-block-poly(propylene glycol)-block-poly(ethylene glycol) may have a Mn between about 1000 and 5000. The ethylene diamine ethylene oxide/propoylene oxide copolymer may be, for example, ethylenediamine tetrakis(propoxylate-block-ethoxylate) tetrol, or an ethylenediamine tetrakis(ethoxylate-block-propoxylate) tetrol. Such ethylene diamine ethylene oxide/propoxylene oxide copolymers may have a Mn ranging, for example from 3000 to 10000.

Other rheology modifier may include alkyl sulfonates, amine ethers (including primary amine ethers such as ROCH$_2$CH$_2$CH$_2$NH$_2$ and ether diamines such as ROCH$_2$CH$_2$CH$_2$NHCH$_2$CH$_2$CH$_2$NH$_2$, where R may be selected from C6 to C18 and may be linear or branched, saturated or unsaturated), amide ethoxylates, a polyester condensation polymer (produced, for example, from condensation reaction of a hydroxy-fatty acid), a polyamine condensation polymer, a fatty polycarboxylic acid, polyether siloxanes, or aluminum salts of fatty acids.

In one or more embodiments, the winterizing agent is at least one aliphatic non-ionic surfactant that has a branched structure and/or includes at least one unsaturation, wherein the winterizing agent has an HLB value between about 8 and 10.5. In one or more embodiments, the winterizing agent has an HLB value of about 8. Further, and as will be demonstrated in the Examples below, after long term exposure to elevated temperatures, a wellbore fluid having a winterizing agent with an HLB value higher than about 10.5 may become degraded and destabilized, presumably due to decomposition of the winterizing agent. Thus, while a non-ionic surfactant having an HLB greater than 10.5 may also perform such winterization, the long term stability of the fluid, particularly at elevated temperatures, would suffer. In one or more embodiments, the winterizing agent, or mixture thereof, may be added to or be present in a wellbore fluid in an amount of about in an amount of about 0.5 to 6 pounds per barrel (ppb), or 1 to 5 ppb, or 1.5 to 4 ppb, where any upper value in the ranges previously recited may be used with any lower value. In one or more embodiments, the winterizing agent has a pour point of less than about −10° C., or less than about −20° C., or less than about −30° C., or less than about −40° C. The lower pour point allows for easier handling of additive compositions including a winterizing agent in cold environments, such as during storage or when applying to wellbore fluids. However, the present winterizing agent is unique because it is effective as a winterizing agent whilst not negatively impacting (and in some cases even it is instead enhancing) the functionality of the rheology modifier being winterized. Conventional winterizing agents have a negative impact on the rheological properties of the fluid. Further, it is also envisioned that in one or more embodiments, the winterizing agent may have a viscosity of less than 100 cP at 25 C or less than 75, 60, or 50 cP in some embodiments.

In one or more embodiments, the winterizing agent may be at least one selected from alcohol alkoxylates and alkylphenolethoxylates. An alcohol ethoxylate winterizing agent according to the present disclosure may be generally depicted by Formula II below.

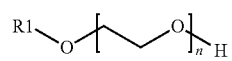

Formula II whereas an alcohol propoxylate would substitute a propylene oxide for the ethylene oxide used in an alcohol ethoxylate. It is also envisioned that a combination of ethoxylation and propoxylation may be used. In Formula II, R1 may be a C10-26 alkyl group containing branching (e.g., non-linear alkyl and/or at least one unsaturation) and n may range between 2 and 8 or 2 and 5 in some embodiments. In one or more embodiments, the R1 group may be based on a Guerbet alcohol, for example. Further, the selection of R1 and n may be based made together so that the resulting HLB is within the described range.

In one or more embodiments, the alcohol ethoxylate winterizing agent of the present disclosure may be depicted by Formula III below. Formula III represents a branched aliphatic winterizing agent that is a secondary alcohol ethoxylate.

Formula III

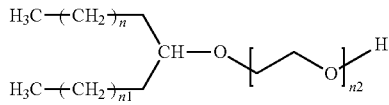

In a particular embodiment, in Formula III, n+n1=10-12 and n2=2-4. In one or more embodiments, the secondary alcohol ethoxylate of Formula III has an n2 value of 2. In one or more embodiments, a winterizing agent according to the limitations of Formula III described above may also function as a rheology modifier that is capable of imparting the desired rheological properties on a fluid to which it is added. Thus, it is envisioned that in some embodiments, the winterized rheology modifier may be an alcohol ethoxylate that falls both within the scope of Formulae I and II. Commercially available products that may function as the winterization agent described above include Tergitol 15-S-3, Tergitol 15-S-5 Tergitol TMN-3, Lutensol ON3, Lutensol TDA3, Lutensol AO3, and Brij L4, among others.

The combination of the winterizing agent with the rheology modifiers may effectively "winterize" the rheology modifiers, thereby facilitating their use in cold environments. Specifically, rheology modifiers as described above when on their own, may solidify or become viscous and difficult to handle at temperatures lower than 10° C. or 5° C. making them unsuitable as a stand-alone additive in such environments where the product may not be able to maintain fluidity, such as when stored in cold environments at a wellbore/drill site. In particular, rheology modifiers may include C16/C18 saturated alcohols and their ethoxylates as impurities and these components tend to crystallize at lower temperature, causing issues with using rheology modifiers in cold environments. Conventional glycol based pour point depressants have been observed to not prevent separation and precipitation of rheology modifiers at low temperatures and the precipitated alcohol alkoxylates can form a dense bottom layer in the storage container that is difficult to effectively mobilize when addition to a wellbore fluid is necessary. Further, the separation means that the properties of the mixture are not uniform and their effects when added to a wellbore fluid may be variable and unknowable. Glycol based pour point depressants can also have a detrimental effect on wellbore fluids and they also have high HLB values, which may further be detrimental to the long term stability of the fluid at high temperatures.

In one or more embodiments, in the winterized rheology modifier additive composition, the rheology modifiers may be up to 90 wt. %, or up to 80 wt. %, or up to 70 wt. %, or up to 60 wt. %, or up to 50 wt. %, or up to 40 wt. %, or up to 30 wt. %, or up to 20 wt. %, or up to 10 wt. % of the combination of rheology modifiers and winterizing agent. In one or more embodiments, the rheology modifiers may be at least 10 wt. %, or at least 20 wt. %, or at least 30 wt. %, or at least 40 wt. %, or at least 50 wt. %, or at least 60 wt. %, or at least 70 wt. %, or at least 80 wt. %, or at least 90 wt. % of the combination of rheology modifiers and winterizing agent. In one or more embodiments, the winterizing agent may be up to 90 wt. %, or up to 80 wt. %, or up to 70 wt. %, or up to 60 wt. %, or up to 50 wt. %, or up to 40 wt. %, or up to 30 wt. %, or up to 20 wt. %, or up to 10 wt. % of the combination of rheology modifiers and winterizing agent. In one or more embodiments, the winterizing agent may be at least 10 wt. %, or at least 20 wt. %, or at least 30 wt. %, or at least 40 wt. %, or at least 50 wt. %, or at least 60 wt. %, or at least 70 wt. %, or at least 80 wt. %, or at least 90 wt. % of the combination of rheology modifiers and winterizing agent.

In one or more embodiments, the additive composition including the winterized rheology modifier may be added at any time to the wellbore fluid. That is, the additive composition may be added to the wellbore fluid during initial formulation or as needed during circulation of the wellbore fluid downhole, for example, in an amount that may range, for example, from 1 to 14 ppb, or from 2 to 10 ppb in more particular embodiments The addition of the additive composition in real time during circulation of the wellbore fluid may allow for careful control of the amount of the additive composition being added so that only the minimum amount necessary to achieve the desired rheology is added. In one or more embodiments, the additive composition may be added to a wellbore fluid formulation either before or after a hot roll process. In some embodiments, improved rheology may be achieved by adding the additive composition after a hot roll process.

Wellbore Fluids

In some embodiments, wellbore fluids disclosed herein may be an oil-based wellbore fluid, such as an invert emulsion containing an aqueous discontinuous phase and an oil-based continuous phase. "Invert emulsion," as used herein, is an emulsion in which a non-oleaginous fluid is the discontinuous phase and an oleaginous fluid is the continuous phase.

"Oleaginous liquid," as used herein, means an oil which is a liquid at 25° C. and is immiscible with water. Oleaginous liquids may include substances such as hydrocarbons used in the formulation of drilling fluids such as diesel oil, mineral oil, synthetic oil (including linear alpha olefins and internal olefins, polydiorganosiloxanes, siloxanes or organosiloxanes), ester oils, glycerides of fatty acids, aliphatic esters, aliphatic ethers, aliphatic acetals, or other such hydrocarbons and combinations of these fluids. The concentration of the oleaginous fluid should be sufficient so that an invert emulsion forms. The concentration of the oleaginous fluid may be less than about 99% by volume of the invert emulsion. In one embodiment the amount of oleaginous fluid is from about 30% to about 95% by volume and more particularly about 40% to about 90% by volume of the invert emulsion fluid.

"Non-oleaginous liquid," as used herein, means any substance that is a liquid at 25° C. and that is not an oleaginous liquid as defined above. Non-oleaginous liquids are immiscible with oleaginous liquids but capable of forming emulsions therewith. Non-oleaginous liquids may include aqueous substances such as fresh water, sea water, brine containing inorganic or organic dissolved salts, aqueous solutions containing water-miscible organic compounds and mixtures of these. The amount of the non-oleaginous fluid is typically less than the theoretical maximum limit for forming an invert emulsion. Thus, the amount of non-oleaginous fluid is less than about 70% by volume. Preferably, the amount of non-oleaginous fluid ranges from about 1% to about 70% by volume, and more preferably from about 5% to about 60% by volume of the invert emulsion fluid.

Suitable oil-based or oleaginous fluids for use in wellbore fluids of the present disclosure may be a natural or a synthetic oil. In one or more embodiments the oleaginous fluid may be selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof.

Non-oleaginous liquids may, in some embodiments, include at least one of fresh water, sea water, brine, mixtures of water and water-soluble organic compounds, and mixtures thereof. In various embodiments, the non-oleaginous fluid may be a brine, which may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

In one or more embodiments, the oil-based wellbore fluid of the present disclosure may also contain at least one of an emulsifier, organophilic clays, a wetting agent, and a weighting agent. These components will be described in greater detail below. Prior to describing the specific components in detail, it should be understood that after addition of the additive composition described herein an oil-based wellbore fluid may have certain heological properties that lead to reduced sag and in particular reduced low temperature sag. For example, a wellbore fluid according to the present disclosure may have rheological properties including a 600 rpm dial value at 40° F. of less than about 300 or less than about 275, or less than about 250. Thus, at low temperatures (such as the temperature at which a fluid is pumped and exposed to high shear), the viscosity is not too high. Generally, a fluid having too high of high end rheology could be modified to have acceptable values at high shear, but such modifications would likely render the fluid unsuitable at low shear (with too low viscosity), particularly at higher temperatures when a fluid would naturally be less viscous. However, advantageously, the present inventors have found that by addition of an additive composition of the present disclosure a wellbore fluid may also have rheological properties including a 6 rpm dial value at 150° F. of between about 6 and 15. Thus, the additive compositions of the present disclosure may provide a fluid that has both acceptable high end rheology at low temperatures and low end rheology at high temperatures, meeting both ends of the spectrum to avoid sag.

Gel strength (i.e., measure of the suspending characteristics or thixotropic properties of a fluid) was evaluated by the 10 minute gel strength in pounds per 100 square feet, in accordance with procedures in API Bulletin RP 1313-2, 1990. In one or more embodiments, a wellbore fluid including an additive composition according to the present disclosure may have rheological properties including a 10 minute gel strength value at 40° F. of less than 40 lbf/100 ft$^2$ or less than 35 lbf/100 ft$^2$. Thus, as described above, fluids including additive compositions of the present disclosure may have advantageous rheological properties at a low temperature (40° F.) without sacrificing rheological properties at higher temperatures.

In fact, one or more embodiments of the present disclosure may be directed to a wellbore fluid having a flat rheology profile. As used herein, "flat rheology profile" means that consistent rheological properties are maintained over temperature ranges from 40° F. to 150° F. The rheological properties of focus for a flat rheology profile include 6 rpm, 10 minute gel (10'), Yield Point (YP), and 10 minute-to-10 second gel ratio (10':10" gel ratio). With respect to 6 rpm, 10' gel, and YP, a system is considered to have a flat rheology profile when these values are within +/−20% of the mean values across temperature ranges from 40° F. to 150° F. Lower percent variation will yield a more flat rheology profile, so values within +/−15% may be present in some embodiments, and +/−10% is even more particular embodiments. With respect to 10':10" gel ratio, a system is considered to have a flat rheology profile when the ratio is 1.5:1 or less.

One of the components of wellbore fluids of the present disclosure is an emulsifier that stabilizes the internal aqueous (non-oleaginous) phase within the external oleaginous fluid to form an invert emulsion. Such emulsifiers may comprise paraffins, fatty-acids, amine-based components, amidoamines, polyolefin amides, soaps of fatty acids, polyamides, polyamines, polyolefin amides, polyolefin amide alkeneamines, alkoxylated ether acids (such as an alkoxylated fatty alcohol terminated with a carboxylic acid), oleate esters, such as sorbitan monoleate, sorbitan dioleate, imidazoline derivatives or alcohol derivatives and combinations or derivatives of the above or the like. Blends of these materials as well as other emulsifiers can be used for this application. Examples of such emulsifiers, such as a high internal phase emulsifier, may be SUREMUL PLUS™ available from MI-SWACO (Houston, Tex.). In particular embodiments, an invert emulsion fluid of the present disclosure may be stabilized by an emulsifier formed from a fatty acid (one or more of a C10-C24 fatty acid, for example, which may include linear and/or branched, and saturated and/or unsaturated fatty acids) reacted with one or more ethyleneamines (e.g., ethylenediamine, diethylenetriamine, triethylenetetraamine, tetraethylenepentaamine) to produce one or more of amides, polyamides, and/or amidoamines, depending, for example, on the mole ratio of the polyamine to the fatty acid. In one or more embodiments, the emulsifier may be a dimer poly-carboxylic C12 to C22 fatty acid, trimer poly-carboxylic C12 to C22 fatty acid, tetramer poly-carboxylic C12 to C22 fatty acid, mixtures of these acids, or a polyamide wherein the polyamide is the condensation reaction product of a C12-C22 fatty acid and a polyamine selected from the group consisting of diethylenetriamine, triethylenetetramine; and tetraethylenepentamine.

While many flat rheology fluids avoid organophilic clays, one or more embodiments of the present disclosure achieves the flat rheology profile desired while incorporating at least one organophilic clay into the invert emulsion fluid. An organophilic clay is defined to mean a clay that is treated in any way to have an organophilic coating or surface treatment. In particular embodiments, the organophilic clay may be an organophilic sepiolite.

In one or more embodiments, untreated clays, including untreated attapulgite clay and untreated sepiolite clay may also be used as viscosifiers in addition to the organophilic clays. Other viscosifiers and gellants, such as oil soluble polymers, styrene-butadiene block polymers, polyamide resins, polycarboxylic acids and soaps may also be used in addition to the organophilic clays. The total amount of viscosifier used in the compositions may vary depending on downhole conditions, as understood by those skilled in the art. However, normally a total amount of about 0.1% to 8% by weight range may be sufficient for most applications.

Weighting agents or density materials suitable for use in wellbore fluid formulations in accordance with the present disclosure include, but are not limited to, hematite, magnetite, iron oxides, illmenite, barite, siderite, celestite, dolomite, calcite, manganese oxides, halites and the like. In one or more embodiments, the weighting agents may be coated with a dispersant.

The quantity of the coated or uncoated weighting agent added, if any, may depend upon the desired density of the final composition. Weighting agents may be added to result in a final fluid density of up to about 22 pounds per gallon (ppg). In other embodiments, the weighting agent may be added to achieve a final fluid density of up to 20 ppg or up to 19.5 ppg. In one or more embodiments, weighting agents may be added to result in a final fluid density of at least about 10 ppg.

In one or more embodiments, the wellbore fluids of the present disclosure may also include at least one particle selected from calcium carbonate or hallyosite. Hallyosite is an aluminosilicate clay that has a tubular morphology. In one or more embodiments, calcium carbonate or hallyosite may be included in the wellbore fluids of the present disclosure in amounts between about 5 and 30 ppb or amounts from 8 to 25 ppb.

Optionally, a secondary rheology modifier may be included in the fluid of the present disclosure to tailor the viscosity to the desired range for the fluid, i.e. flatten the rheological characteristics, of the drilling fluid over a temperature range from about 40° F. to about 150° F. The secondary rheology modifier may be polyamides, polyamines, amidoamines, polyetheramines, or mixtures thereof. Polyamides may be derived from reacting a polyamine with the reaction product of an alcoholamine and a fatty acid, for example. Generally, the alcoholamine-fatty acid reaction is based on a one equivalent of fatty acid for each equivalent of alcoholamine present. This reaction product is then reacted on a 1:1 equivalent ratio with the polyamine, and then quenched with a propylenecarbonate to remove any free unreacted amines. With respect to the rheology modifier, alcoholamines of the present disclosure may be selected from the group consisting of monoethanolamine, diethanolamine, triethanolamine, and mixtures thereof. Fatty acids may include tall oil or other similar unsaturated long chain carboxylic acids having from about 12 to about 22 carbon atoms. The fatty acids may be dimer or trimer fatty acids, or combinations thereof. As previously mentioned, once the alcoholamine has been reacted with the fatty acid, the reaction product is then further reacted with a polyamine. With respect to the rheology modifier, polyamines may be selected from the group consisting of diethylene triamine, triethylene tetramine, tetraethylene pentamine, and combinations thereof. Commercially available rheology modifiers that provide flat rheology wellbore fluids include EMI-1005, available from M-1 SWACO (Houston, Tex.), and TECHWAX™ LS-10509 and LS-20509, both available from International Specialty Products (Wayne, N.J.).

It is conventional in many invert emulsions to include an alkali reserve so that the overall fluid formulation is basic (i.e. pH greater than 7). Typically, this is in the form of lime or alternatively mixtures of alkali and alkaline earth oxides and hydroxides. One of skill in the art should understand and appreciate that the lime content of a well bore fluid will vary depending upon the operations being undertaken and the formations being drilled. Further it should be appreciated that the lime content, also known as alkalinity or alkaline reserve, is a property that is typically measured in accordance with the applicable API standards which utilize methods that should be well known to one of skill in the art of fluid formulation.

Fluid loss control agents typically act by coating the walls of the borehole as the well is being drilled. Suitable fluid loss control agents which may find utility in this invention include modified lignites, asphaltic compounds, gilsonite, organophilic humates prepared by reacting humic acid with amides or polyalkylene polyamines, and other non-toxic fluid loss additives. Typically, fluid loss control agents are added in amounts less than about 10% and preferably less than about 5% by weight of the fluid.

The method used in preparing wellbore fluids described herein is not critical. For example, conventional methods can be used to prepare the wellbore fluids in a manner analogous to those normally used, to prepare conventional oil-based drilling fluids. In one representative procedure, a desired quantity of oleaginous fluid such as a base oil and a suitable amount of the remaining components are added sequentially with continuous mixing. An invert emulsion of the present disclosure is formed by vigorously agitating, mixing or shearing the oleaginous fluid with a non-oleaginous fluid.

The disclosed wellbore fluids are especially useful in the drilling, completion and working over of subterranean oil and gas wells. In particular, the fluids are useful in formulating drilling fluids and completion fluids for use in high deviation wells, and long reach wells. Such fluids are especially useful in the drilling of horizontal wells into hydrocarbon bearing formations. Thus, such fluids, upon the inclusion of the winterized rheology modifier, may be pumped into a wellbore and circulated therethrough. In one or more embodiments, prior to being pumped downhole the rheological properties of an initial wellbore fluid may be tested, and a winterized rheology modifier may be added thereto to tailor the rheological properties to within the desired ranges described herein.

EXAMPLES

In the first example a 11.25 pound per gallon (ppg) seed mud was treated as shown in Table 1 below to create 14.5 ppg fluids of Example 1. In Example 1, Alcohol Ethoxylate 1 is used as a rheology modifier and had an HLB value of 6.6 and was according to Formula I above with an oleyl group as the R group and an n value of 3.

TABLE 1

|  | Example 1 (g) |
|---|---|
| EMS4720, Seven LA, 11.25 ppg | 240.0 |
| IO 1618 | 50.0 |
| Suremul | 10.0 |
| Alcohol Ethoxylate 1 | 4.0 |
| 25% CaCl2 Brine | 12.0 |
| ECOTROL HT | 3.0 |
| DURAMOD | 4.0 |
| EMI-1776 | 250.0 |
| API EVAL CLAY | 25.0 |

The rheology of the mud of Example 1 is shown in Table 2 below.

TABLE 2

| Heat Aging Temp, °F. | INITIAL | | | 325 | | | 325 | | |
|---|---|---|---|---|---|---|---|---|---|
| Heat Aging, hr | | | | 16 | | | 160 | | |
| Static/Rolling | | | | Dynamic | | | Static | | |
| Mud Weight, lb/gal | 14.50 | | | 14.50 | | | 14.50 | | |
| Rheology Temp, °F. | 40 | 100 | 150 | 40 | 100 | 150 | 40 | 100 | 150 |
| R600, °VG | 278 | | 88 | 286 | 141 | 96 | 280 | 141 | 98 |
| R300, °VG | 152 | | 53 | 160 | 83 | 59 | 156 | 83 | 61 |
| R200, °VG | 110 | | 40 | 115 | 61 | 46 | 112 | 62 | 47 |
| R100, °VG | 64 | | 26 | 67 | 39 | 31 | 65 | 40 | 32 |
| R6, °VG | 12 | | 8 | 13 | 13 | 12 | 13 | 13 | 13 |
| R3, °VG | 10 | | 7 | 11 | 11 | 12 | 11 | 12 | 12 |
| PV, cP | 126 | 0 | 35 | 126 | 58 | 37 | 124 | 58 | 37 |
| YP, lb/100 ft$^2$ | 26 | 0 | 18 | 34 | 25 | 22 | 32 | 25 | 24 |
| LSYP, lb/100 ft$^2$ | 8 | 0 | 6 | 9 | 9 | 12 | 9 | 11 | 11 |
| 10-sec Gel, lb/100 ft$^2$ | 12 | | 9 | 14 | 14 | 16 | 14 | 15 | 16 |
| 10-min Gel, lb/00 ft$^2$ | 22 | | 20 | 31 | 30 | 33 | 28 | 32 | 27 |
| Static Shear, lb/100 ft$^2$ | | | | | | | | | |
| E.S. @150° F., V | | 1065 | | | 1008 | | | 1019 | |
| HTHP Temp, °F. | | | | | 325 | | | 325 | |
| HTHP FL, ml | | | | | 7.4 | | | 8.6 | |
| Water in HTHP Filtrate, ml | | | | | 0 | | | 0 | |

Example 2 is a fluid with the same composition as that for Example 1 (shown in Table 1 above), with the exception being that 4 ppb of a secondary alcohol ethoxylate according to Formula III, where n+n1=12 and n2=2 was used instead of Alcohol Ethoxylate 1. This secondary alcohol ethoxylate has an HLB of about 8. The rheology of the mud of Example 2 is shown in Table 3 below.

TABLE 3

| Heat Aging Temp, °F. | INITIAL | | | 325 | | | 325 | | |
|---|---|---|---|---|---|---|---|---|---|
| Heat Aging, hr | | | | 16 | | | 160 | | |
| Static/Rolling | | | | Dynamic | | | Static | | |
| Mud Weight, lb/gal | 14.50 | | | 14.50 | | | 14.50 | | |
| Rheology Temp, °F. | 40 | 100 | 150 | 40 | 100 | 150 | 40 | 100 | 150 |
| R600, °VG | 286 | | 93 | 285 | 145 | 95 | 290 | 145 | 110 |
| R300, °VG | 159 | | 56 | 164 | 89 | 60 | 165 | 98 | 65 |
| R200, °VG | 114 | | 43 | 117 | 67 | 47 | 121 | 66 | 51 |
| R100, °VG | 66 | | 28 | 71 | 46 | 32 | 75 | 44 | 37 |
| R6, °VG | 16 | | 9 | 20 | 17 | 14 | 19 | 19 | 20 |
| R3, °VG | 14 | | 9 | 17 | 16 | 14 | 16 | 18 | 20 |
| PV, cP | 127 | 0 | 37 | 121 | 56 | 35 | 125 | 47 | 45 |
| YP, lb/100 ft$^2$ | 32 | 0 | 19 | 43 | 33 | 25 | 40 | 51 | 20 |
| LSYP, lb/100 ft$^2$ | 12 | 0 | 9 | 14 | 15 | 14 | 13 | 17 | 20 |
| 10-sec Gel, lb/100 ft$^2$ | 18 | | 13 | 22 | 22 | 20 | 25 | 31 | 30 |
| 10-min Gel, lb/100 ft$^2$ | 33 | | 24 | 39 | 32 | 30 | 49 | 41 | 36 |
| Static Shear, lb/100 ft$^2$ | | | | | | | | | |
| E.S. @150° F., V | | | | | 1020 | | | 600 | |
| HTHP Temp, °F. | | | | | 325 | | | 325 | |
| HTHP FL, ml | | | | | 6.2 | | | 15 | |
| Water in HTHP Filtrate, ml | | | | | 0 | | | 0 | |

Comparative Example 1 is a fluid with the same composition as that for Example 1 (shown in Table 1 above), with the exception being that 4 ppb of a secondary alcohol ethoxylate according to Formula III, where n+n1=12 and n2=6 was used instead of Alcohol Ethoxylate 1. This secondary alcohol ethoxylate has an HLB value of about 12 and an n2 value outside of the range discussed above for being appropriate for an additive composition. The rheology of the mud of Comparative Example 1 is shown in Table 4 below.

TABLE 4

| Heat Aging Temp, °F. | INITIAL | | | 325 | | | 325 | | |
|---|---|---|---|---|---|---|---|---|---|
| Heat Aging, hr | | | | 16 | | | 160 | | |
| Static/Rolling | | | | Dynamic | | | Static | | |
| Mud Weight, lb/gal | | 14.50 | | | 14.50 | | | 14.50 | |
| Rheology Temp, °F. | 40 | 100 | 150 | 40 | 100 | 150 | 40 | 100 | 150 |
| R600, °VG | 300 | | 89 | >300 | 154 | 107 | >300 | 218 | 165 |
| R300, °VG | 172 | | 54 | 172 | 93 | 66 | 287 | 131 | 108 |
| R200, °VG | 130 | | 41 | 121 | 71 | 52 | 211 | 99 | 85 |
| R100, °VG | 78 | | 27 | 68 | 45 | 35 | 129 | 65 | 60 |
| R6, °VG | 20 | | 9 | 12 | 17 | 15 | 34 | 24 | 29 |
| R3, °VG | 16 | | 8 | 9 | 15 | 14 | 30 | 22 | 27 |
| PV, cP | 128 | 0 | 35 | ##### | 61 | 41 | ##### | 87 | 57 |
| YP, lb/100 ft² | 44 | 0 | 19 | ##### | 32 | 25 | ##### | 44 | 51 |
| LSYP, lb/100 ft² | 12 | 0 | 7 | 6 | 13 | 13 | 26 | 20 | 25 |
| 10-sec Gel, lb/100 ft² | 20 | | 10 | 10 | 20 | 19 | 44 | 28 | 29 |
| 10-min Gel, lb/100 ft² | 39 | | 19 | 18 | 32 | 28 | 75 | 37 | 39 |
| Static Shear, lb/100 ft² | | | | | | | | | |
| E.S. @150° F., V | | 514 | | | 537 | | | 692 | |
| HTHP Temp, °F. | | | | | 325 | | | 325 | |
| HTHP FL, ml | | | | | 10 | | | 16.6 | |
| Water in HTHP Filtrate, ml | | | | | 0 | | | 0 | |

Comparative Example 2 is a fluid with the same composition as that for Example 1 (shown in Table 1 above), with the exception being that 4 ppb of a secondary alcohol ethoxylate according to Formula III, where n+n1=12 and n2=8 was used instead of Alcohol Ethoxylate 1. This secondary alcohol ethoxylate has an HLB value of about 13 and an n2 value outside of the range discussed above for being appropriate for an additive composition. The rheology of the mud of Comparative Example 2 is shown in Table 5 below.

TABLE 5

| Heat Aging Temp, °F. | INITIAL | | | 325 | | | 325 | | |
|---|---|---|---|---|---|---|---|---|---|
| Heat Aging, hr | | | | 16 | | | 160 | | |
| Static/Rolling | | | | Dynamic | | | Static | | |
| Mud Weight, lb/gal | | 14.50 | | | 14.50 | | | 14.50 | |
| Rheology Temp, °F. | 40 | 100 | 150 | 40 | 100 | 150 | 40 | 100 | 150 |
| R600, °VG | 300+ | | 95 | 300+ | 155 | 110 | 300+ | 175 | 139 |
| R300, °VG | 180 | | 60 | 210 | 92 | 70 | 235 | 105 | 92 |
| R200, °VG | 132 | | 45 | 154 | 70 | 54 | 177 | 79 | 74 |
| R100, °VG | 79 | | 30 | 90 | 45 | 37 | 110 | 52 | 54 |
| R6, °VG | 20 | | 10 | 20 | 16 | 16 | 35 | 20 | 29 |
| R3, °VG | 18 | | 10 | 15 | 15 | 16 | 32 | 17 | 26 |
| PV, cP | ##### | 0 | 35 | ##### | 63 | 40 | ##### | 70 | 47 |
| YP, lb/100 ft² | ##### | 0 | 25 | ##### | 29 | 30 | ##### | 35 | 45 |
| LSYP, lb/100 ft² | 16 | 0 | 10 | 10 | 14 | 16 | 29 | 14 | 23 |
| 10-sec Gel, lb/100 ft² | 24 | | 14 | 27 | 21 | 24 | 50 | 25 | 32 |
| 10-min Gel, lb/100 ft² | 38 | | 24 | 50 | 37 | 30 | 85 | 37 | 39 |
| Static Shear, lb/100 ft² | | | | | | | | | |
| E.S. @150° F., V | | | | | 350 | | | 370 | |
| HTHP Temp, °F. | | | | | 325 | | | 325 | |
| HTHP FL, ml | | | | | 10 | | | 14 | |
| Water in HTHP Filtrate, ml | | | | | 0 | | | 0 | |

Comparative Example 3 is a fluid with the same composition as that for Example 1 (shown in Table 1 above), with the exception being that 4 ppb of tristyrylphenol with 14 ethoxylate groups was used instead of Alcohol Ethoxylate 1. This compound has an HLB value of about 13. The rheology of the mud of Comparative Example 3 is shown in Table 6 below.

TABLE 6

| | INITIAL | | | 325 | | | 325 | | |
|---|---|---|---|---|---|---|---|---|---|
| Heat Aging Temp, °F. | | | | | | | | | |
| Heat Aging, hr | | | | 16 | | | 160 | | |
| Static/Rolling | | | | Dynamic | | | Static | | |
| Mud Weight, lb/gal | | 14.50 | | | 14.50 | | | 14.50 | |
| Rheology Temp, °F. | 40 | 100 | 150 | 40 | 100 | 150 | 40 | 100 | 150 |
| R600, °VG | 300+ | | 130 | 300+ | 179 | 138 | 300+ | 220 | 155 |
| R300, °VG | 200 | | 80 | 199 | 110 | 91 | 225 | 137 | 109 |
| R200, °VG | 150 | | 60 | 146 | 89 | 75 | 167 | 109 | 90 |
| R100, °VG | 92 | | 40 | 90 | 60 | 54 | 105 | 75 | 71 |
| R6, °VG | 20 | | 16 | 24 | 25 | 32 | 31 | 35 | 48 |
| R3, °VG | 16 | | 15 | 22 | 24 | 32 | 30 | 34 | 47 |
| PV, cP | ##### | 0 | 50 | ##### | 69 | 47 | ##### | 83 | 46 |
| YP, lb/100 ft² | ##### | 0 | 30 | ##### | 41 | 44 | ##### | 54 | 63 |
| LSYP, lb/100 ft² | 12 | 0 | 14 | 20 | 23 | 32 | 29 | 33 | 46 |
| 10-sec Gel, lb/100 ft² | 17 | | 24 | 24 | 40 | 41 | 41 | 45 | 48 |
| 10-min Gel, lb/100 ft² | 46 | | 38 | 38 | 53 | 44 | 85 | 62 | 52 |
| Static Shear, lb/100 ft² | | | | | | | | | |
| E.S. @150° F., V | | | | | 850 | | | 900 | |
| HTHP Temp, °F. | | | | | 325 | | | 325 | |
| HTHP FL, ml | | | | | 16 | | | 19 | |
| Water in HTHP Filtrate, ml | | | | | 0.1 | | | 0.2 | |

Example 3—Additive Compositions at Low Temperatures

Compositions of rheology modifiers and winterizing agents according to the present disclosure were prepared, placed in a glass jar, and held at 4° F. for three days before being physically examined. Upon visual inspection the rheology modifier Alcohol Ethoxylate 1 alone solidified into a mass. A 75/25 by weight blend of Alcohol Ethoxylate 1 and a winterizing agent according to Formula III, where n+n1=12 and n2=2 remained a liquid and showed minimal and easily reversible phase separation upon agitation. A 50/50 by weight blend of Alcohol Ethoxylate 1 and a winterizing agent according to Formula III, where n+n1=12 and n2=2 remained a liquid and showed minimal and easily reversible phase separation upon agitation. The latter two additive compositions were reproduced with a different supplier of Alcohol Ethoxylate 1 and less or substantially zero phase separation was observed. Presumably, the difference in the phase separation observed is due to the presence (or lack thereof) of C16/C18 saturated alcohols and their ethoxylates as impurities in the Alcohol Ethoxylate 1 samples used, these impurities tend to crystallize or otherwise separate at lower temperatures.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. An additive composition, comprising: at least one alcohol ethoxylate rheology modifier having an HLB ranging from about 4 to 10 and being selected from group consisting of oleyl alcohol-2-ethoxylate, oleyl alcohol-3-ethoxylate, oleyl alcohol-5-ethoxylate, stearyl alcohol-2-ethoxylate, stearyl alcohol-3-ethoxylate, lauryl alcohol-4-ethoxylate, and tridecyl alcohol-3-ethoxylate; and
a winterizing agent that is at least one aliphatic non-ionic surfactant that has a branched structure and/or includes at least one unsaturation, wherein the winterizing agent has an HLB value between about 8 and 10.5.

2. The additive composition of claim 1, wherein the winterizing agent has a pour point of less than about −10° C.

3. The additive composition of claim 1, wherein the additive composition includes between about 10 wt. % and 90 wt. % of the at least one alcohol ethoxylate rheology modifier and 10 wt. % and 90 wt. % of the winterizing agent.

4. The additive composition of claim 1, wherein the winterizing agent is a secondary alcohol ethoxylate.

5. The additive composition of claim 4, wherein the secondary alcohol ethoxylate is depicted by Formula III:

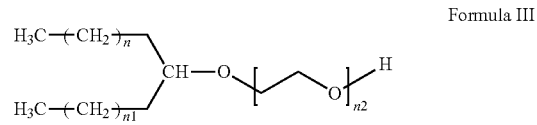

Formula III wherein n+n1=12 and n2=2-4.

6. A method of modifying cold temperature stability of a rheology modifier, the method comprising:
combining the winterizing agent and the at least one alcohol ethoxylate rheology modifier of claim 1 to form a winterized composition.

7. A method of modifying a wellbore fluid, comprising:
adding the additive composition of claim 1 to an invert emulsion wellbore fluid.

8. The method of claim 7, further comprising:
measuring rheological properties of the invert emulsion wellbore fluid prior to the addition.

9. The method of claim 8, further comprising adding the additive composition in response to the measured rheological properties.

10. A wellbore fluid, comprising:
an oleaginous continuous phase;
a non-oleaginous discontinuous phase;
an emulsifier stabilizing the non-oleaginous discontinuous phase in the oleaginous continuous phase; and
the additive composition of claim 1.

11. An additive composition, comprising:
a rheology modifier having an HLB ranging from about 4 to 10 and comprising at least one alcohol ethoxylate depicted by Formula I:

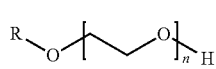

Formula I wherein R is an oleyl group, and n is between 2 and 5; and a winterizing agent that is at least one aliphatic non-ionic surfactant that has a branched structure and/or includes at least one unsaturation, wherein the winterizing agent has an HLB value between about 8 and 10.5.

12. The additive composition of claim 11, wherein the at least one alcohol ethoxylate is selected from group consisting of oleyl alcohol-2-ethoxylate, oleyl alcohol-3-ethoxylate, and oleyl alcohol-5-ethoxylate.

* * * * *